Nov. 15, 1949     W. E. HAPPEL     2,488,403
CONTROL SYSTEM
Filed Dec. 12, 1945
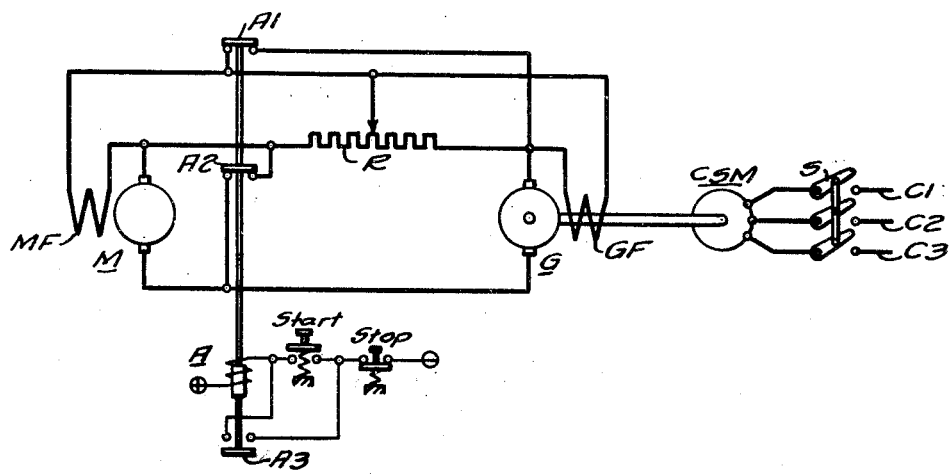
WITNESSES:
INVENTOR
William E. Happel.
BY
ATTORNEY Patented Nov. 15, 1949

2,488,403

UNITED STATES PATENT OFFICE 2,488,403

CONTROL SYSTEM

William E. Happel, Waynesboro, Pa., assignor to Landis Tool Company, Waynesboro, Pa., a corporation of Pennsylvania Application December 12, 1945, Serial No. 634,546

7 Claims. (Cl. 318—140)

This invention relates generally to series variable voltage drives, and more particularly to a series variable voltage motor and generator drive in which the motor and generator are each of the series wound type and are of substantially equal rating.

In certain of its aspects, this invention is related to the copending applications of William E. Happel, the inventor in this application, Serial Numbers 634,544 and 634,545, both filed on the same date as this application and entitled Control system, each application being assigned to the same assignee as this invention.

As a general rule, series variable voltage drives are characterized by a marked slowness in build-up of the series generator output at low field strength and poor dynamic braking characteristics at low motor speed. Measurable improvements in these respects can be realized in part by proper excitation control of the motor series field during dynamic braking and in part through proper control of the series generator output to maintain an active magnetic circuit in the generator during periods when the motor is stopped. This invention utilizes these basic principles to obtain the desired operating characteristics of the system.

One object of this invention is to provide a variable voltage drive embodying a series connected series motor and series generator having effective dynamic braking over the entire speed range of the motor and particularly at low motor speeds.

Another and equally important object of this invention is to provide a series variable voltage drive of the type mentioned in which quick motor starting particularly at low motor speeds is obtained.

Yet another object of this invention is to provide a series connected series motor and series generator system which combines the characteristics of quick motor starting and effective dynamic braking of the motor.

The foregoing objects are merely illustrative of the various aims and objects of this invention. Other objects and advantages will become apparent upon a study of the following specification when considered in conjunction with the accompanying drawing, in which the single figure thereof illustrates a variable voltage series motor and series generator system embodying the principles of this invention.

In the figure, M designates a series motor and G designates a series generator. The two dynamoelectric machines are usually, although not necessarily, of the same frame size and thus have comparable ratings. Each machine is provided with a series field winding, that for the motor being designated MF and that for the generator being designated GF. The machines are connected in a series loop circuit. Generator G is driven by a suitable constant speed motor CSM which, by way of illustration but not limitation, may be an induction motor adapted for connection to the alternating-current supply conductors C1, C2 and C3 through the switch S.

In order to simplify the illustration of this invention, the usual control and protective devices normally incorporated in a system of the type disclosed have been eliminated. It is to be understood, however, that devices of the character mentioned may be incorporated in the system of this invention without departing from the spirit and scope thereof.

In keeping with the foregoing, there is illustrated a simple arrangement including the rheostat R for controlling the field strength of the motor and generator. This rheostat is located in a parallel branch of the series circuit connecting the two machines and its adjustable tap is connected to the series circuit between the series fields of the two machines. The rheostat R carries a portion of the load current and thus has a voltage drop thereacross in dependence of the load current. Movement of the adjustable tap to the left or to the right oppositely varies the strength of the series fields MF and GF thereby providing a wide range speed control of the motor.

Starting and stopping of the motor is controlled by the Start and Stop push buttons which are connected in series with the coil of the relay A. Relay A includes a set of three contacts. Contacts A1 when closed short-circuit the series generator field GF, contacts A2 bridge the motor armature winding and short it from the generator load circuit, while contacts A3 establish a holding circuit for the coil of relay A independently of the Start push button.

Assuming switch S is closed and the generator G is up to normal speed, operation of the system is effected by pressing the Start push button. This energizes relay A from the positive and negative terminals indicated whereupon the contacts A1 and A2 open and contacts A3 close maintaining the energizing circuit for the coil of the relay. When contacts A1 and A2 are open, the motor and generator are connected in the conventional series loop and the motor may be controlled for various operating speeds by adjustment of the rheostat R.

When the Stop push button is pressed, relay A assumes the position indicated in the drawing in which contacts A1 and A2 are closed. A short-circuit path is thus formed around the generator field GF at contacts A1 whereby a major portion of the load current is circulated around the generator field. As a consequence, the generator voltage is reduced substantially to its residual value. Contacts A2 short-circuit the motor armature winding from the generator load circuit. The motor field winding MF, however, remains in the load circuit of the generator and its excitation is maintained, in part, due to the inductance thereof which delays its collapse and, in part, due to the generator current circulated therethrough. The reaction of the opposed magnetic forces in the motor, caused by the comparatively strong motor field flux and the armature flux produced by the regenerative armature currents of the motor which circulate in the short-circuited loop including the contacts A2, produces a strong dynamic braking force on the motor which rapidly brings the motor to rest.

The control arrangement also provides quick starting of the motor. This follows from the short-circuit load on the generator effected at the contacts A2 and the shunting effect at contacts A1. The generator residual voltage circulates a small current through the generator load circuit set up at contacts A2, thereby maintaining an active magnetic circuit in the generator even when the motor is stopped. It is, therefore, unnecessary to wait for the generator to build up an active magnetic circuit when starting the motor. Another characteristic tending to speed up starting results from the fact that a controlled exciting current is circulating in the motor series field when the motor is at rest. The shunt path around the generator field set up by contacts A1 prevents the generator series field from building up during periods when the motor is stopped. Thus generator overload during periods when the motor is stopped is obviated.

The foregoing disclosure and the showing made in the drawing are merely illustrative of the principles of this invention and are not to be considered in a limiting sense. The only limitations are to be determined from the scope of the appended claims.

I claim as my invention:

1. An electrical system comprising, in combination, a motor having an armature winding and a series field winding, a generator having an armature winding and a series field winding, circuit means connecting said motor and generator in series circuit relation, a contact device connected across the motor armature winding for establishing a shunting circuit around said motor armature winding, a contact device connected across said generator series field winding for establishing a shunting circuit around said generator series field winding, and circuit means for simultaneously closing said contact devices to establish said shunting circuits and for simultaneously opening said contact devices to open said shunting circuits.

2. A control system for a series connected motor and generator, the motor being a series motor having an armature winding and a series field winding and the generator being a series generator having an armature winding and a series field winding comprising, in combination, contact means for shunting the motor armature winding, contact means for shunting the generator series field winding, and circuit means for simultaneously opening and closing said contact means.

3. A control system for a series connected motor and generator, the motor being a series motor having an armature winding and a series field winding and the generator being a series generator having an armature winding and a series field winding comprising, in combination, first contact means connected across the terminals of the motor armature, second contact means connected across the series field winding of the generator, and control means for simultaneously operating said contact means to effect closure thereof.

4. A control system for a series connected motor and generator, the motor being a series motor having an armature winding and a series field winding and the generator being a series generator having an armature winding and a series field winding comprising, in combination, first normally closed contact means connected across the terminals of the motor armature winding, second normally closed contact means connected across the generator series field winding, electromagnetic means for simultaneously opening the said contact means to effect starting of said motor, and circuit means forming a resistance shunt around the generator series field winding and the motor series field winding.

5. A control system for a series connected motor and generator, the motor being a series motor having an armature winding and a series field winding and the generator being a series generator having an armature winding and a series field winding comprising, in combination, first contact means connected across the terminals of the motor armature, second contact means connected across the generator series field winding, electromagnetic means for simultaneously operating said contact means to closed position, and a potentiometer connected across the series field winding of the generator and the series field winding of the motor, having a variable tap connected between the series field windings.

6. An electrical system comprising, in combination, a motor having an armature winding and a series field winding, a generator having an armature winding and a series field winding, circuit means connecting said motor and generator in series circuit relation, and contacting means for establishing a circuit shunting said motor armature winding and said generator series field winding, said motor armature shunt serving to stop said motor while maintaining a circuit with said generator, the shunt around said generator series field serving to maintain a minimum current flowing in said circuit and corresponding to the residual voltage of the generator.

7. An electrical system comprising, in combination, a motor having an armature winding and a series field winding, a generator having an armature winding and a series field winding, circuit means connecting said motor and generator in series circuit relation, means for shunting said motor armature, and means for maintaining a predetermined minimum generator current in said motor series field winding when said motor armature is shunted including a shunt around said generator series field to form a loop circuit including the generator armature, the generator series field shunt, the motor series field and the motor armature shunt.

WILLIAM E. HAPPEL.

REFERENCES CITED

The following references are of record in the file of this patent:

UNITED STATES PATENTS

| Number | Name | Date |
|---|---|---|
| 516,804 | Fiske | Mar. 20, 1894 |
| 1,905,808 | Couwenhoven | Apr. 25, 1933 |
| 2,154,279 | Muller | Apr. 11, 1939 |
| 2,298,735 | Gray | Oct. 13, 1942 |